Oct. 21, 1958     A. NUTTING     2,857,017
CORRUGATED WEB FILTER

Filed Nov. 14, 1955     2 Sheets-Sheet 1

INVENTOR.
ARTHUR NUTTING
BY
ATTORNEY

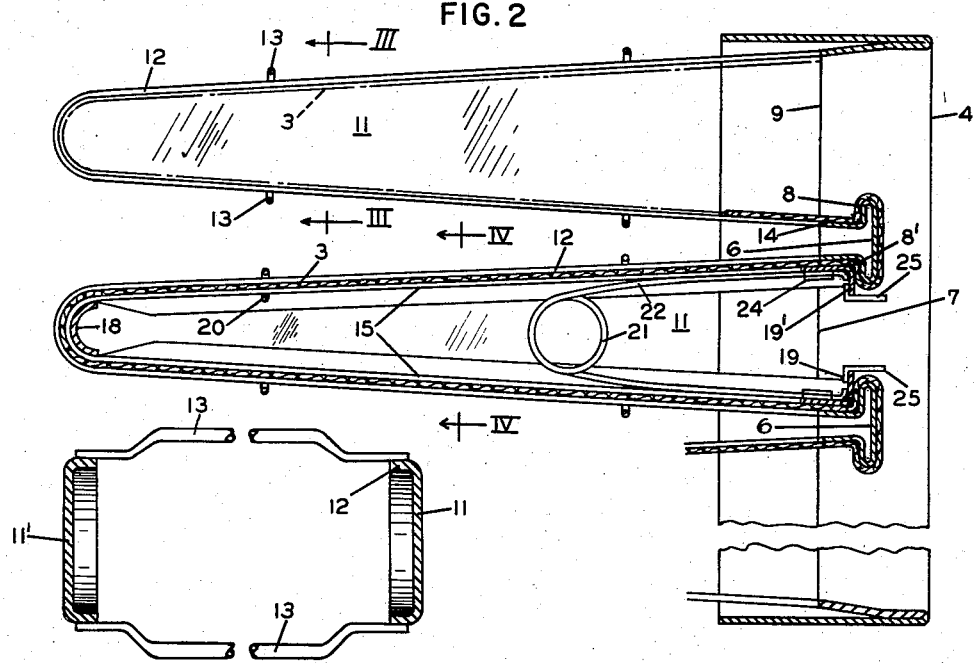
FIG. 2
FIG. 3
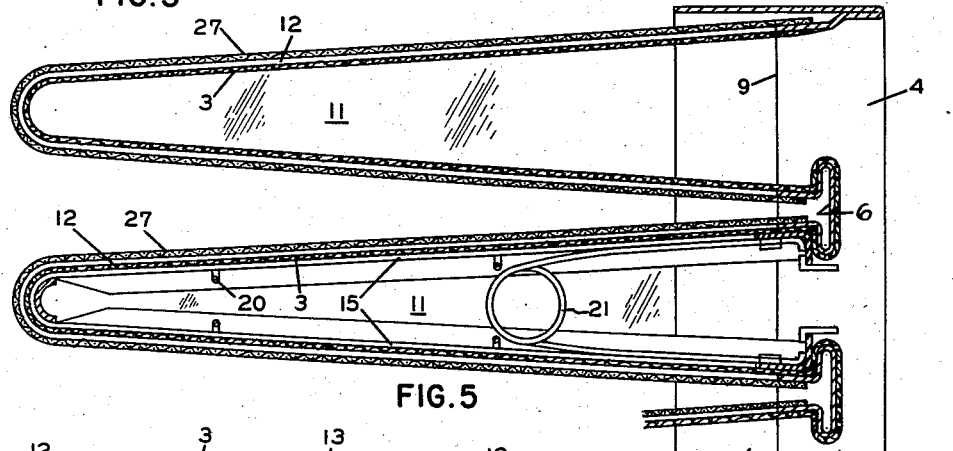
FIG. 5
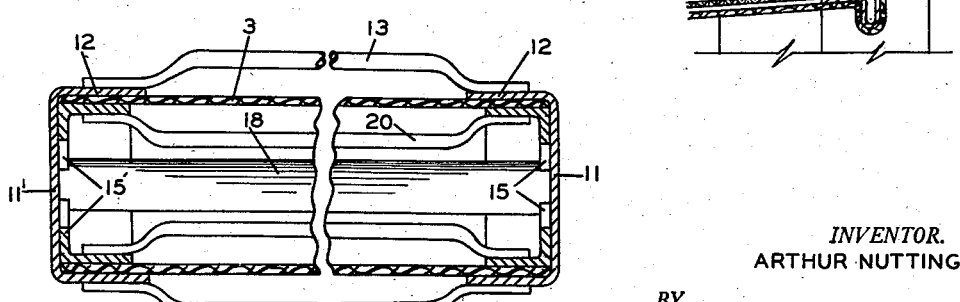
FIG. 4
INVENTOR.
ARTHUR NUTTING

United States Patent Office 2,857,017
Patented Oct. 21, 1958

2,857,017

CORRUGATED WEB FILTER

Arthur Nutting, Louisville, Ky., assignor to American Air Filter Company, Inc., Louisville, Ky., a corporation of Delaware Application November 14, 1955, Serial No. 546,569

3 Claims. (Cl. 183—71)

The present invention relates to an air filter of the type employing a corrugated web of filtering medium.

In such filters, the filter web is provided in the form of a sheet or roll, and the usual practice is to form the web into a corrugated form in a frame at the factory, and supply such loaded frames to the user, to replace the used filter element.

It is an object of the present invention to provide a filter structure in which a web of filter medium is easily loaded from a roll into the filter in corrugated shape at the installation.

A further object is the provision of an improved mechanism or frame for holding a corrugated filter in place.

According to the present invention, I provide a filter holder or frame having a plurality of pairs of opposed triangular end plates having inturned flanges along the edges of the plates, the flanges serving to receive and support the running edges of a filter sheet which is contoured to fit the plates, and I provide a clamp or insert which engages and presses the edge of the filter sheet against the flanges. The clamp preferably is in the form of a pair of frames hinged to form a V, and suitably biased to spread position. The filter structure provides a suitable detent or retaining mechanism to hold the clamp in place. The clamp may be released by manually squeezing together the hinged portions, and upon withdrawing the clamp, the used filter sheet may be replaced. Individual clamps for each filter pocket or compartment are provided, and are employed to corrugate and position the renewal filter sheet in the filter frame.

The invention is described in greater detail in the following specification taken in connection with the accompanying drawing illustrating preferred embodiments of the invention and wherein:

Figure 2 is a fragmentary sectional view taken on line II—II of Figure 1, with a clamp positioned in one of the pockets;

Figure 3 is a section taken on line III—III of Figure 2;

Figure 4 is a section taken on line IV—IV of Figure 2;

Figure 5 is a view similar to Figure 2, of a modification;

Figure 6 is a perspective view of a clamp;

Figure 7 is a fragmentary elevational view showing the manner of holding the spring in the clamp; and Figure 8 is an elevational view of a detail.

Figure 1:
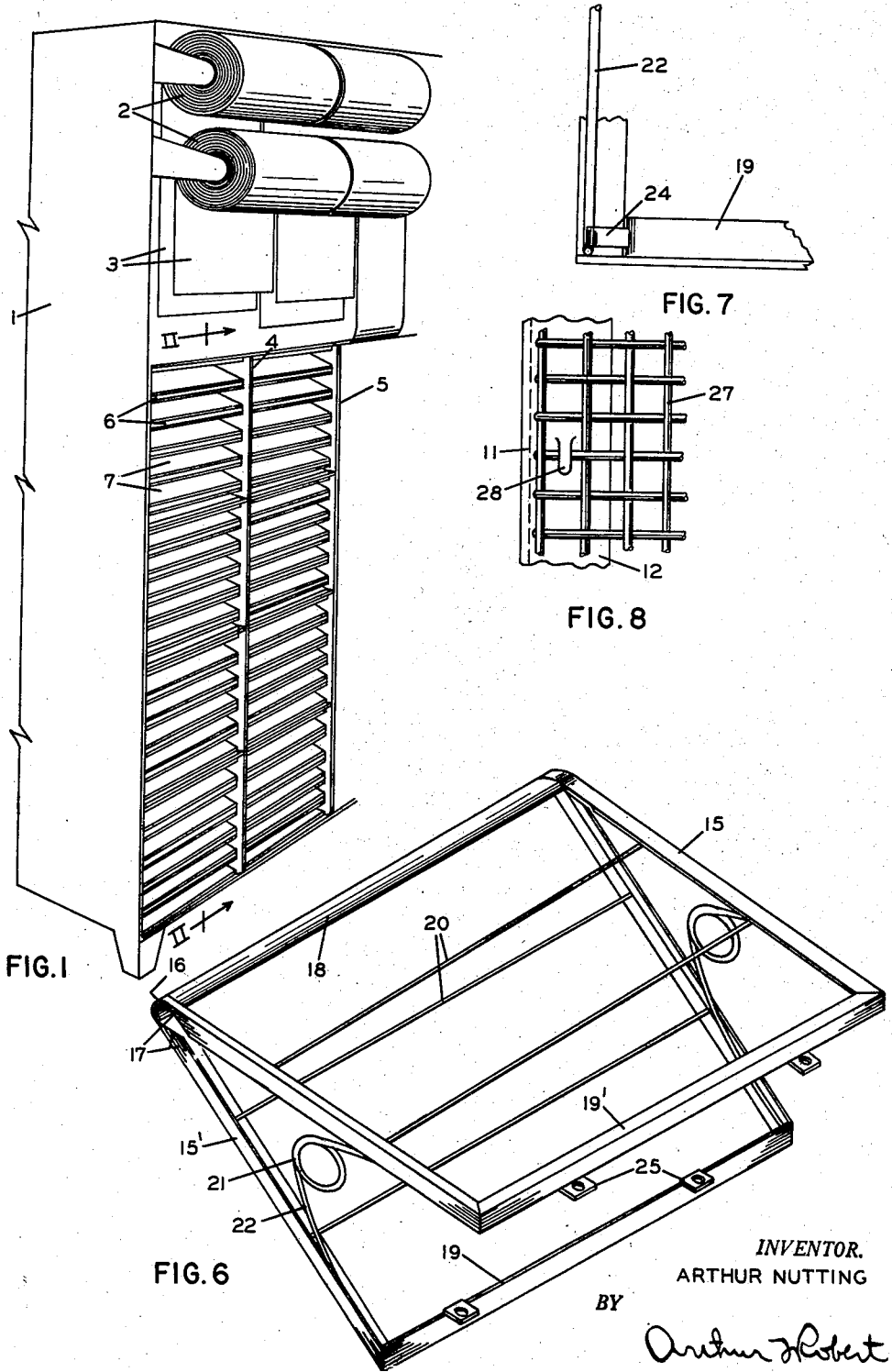
Figure 1 is a fragmentary perspective view of a filter cabinet.

Referring to the drawing, Figure 1, there is shown a cabinet 1, at the top of which are mounted supply rolls 2 of a suitable filter web 3, such as glass wool or the like. The lower part of the cabinet is divided by vertical side walls 4, 5, etc., into a plurality of similar columns, which in turn are divided by horizontal bars 6 to provide sections or pockets 7, adapted to receive a filter web therein arranged in corrugated form. As shown in Figure 2, the horizontal bars 6 which divide the columns into pockets, are generally T shape in cross section, and are attached in any suitable manner to the opposite vertical side walls of the columns. These bars conveniently are made by folding sheet metal into the desired shape, so as to provide shoulders 8, 8' on opposite sides of the stem of the T. As the pockets 7 are alike, except for variations in the top and bottom pockets, the structure of only one pocket will be described in detail.

The side wall 4 is constructed of sheet metal and is doubled back on itself as indicated at 9 to provide a socket to receive the base of a triangular or V shaped metal plate 11, the plate being held in place by spot welding, or by any other desired fastening. The plate 11 is bent over at its edge to form a flange 12. The opposite wall of the column similarly carries a flanged plate 11' (Figs. 3 and 4) and a plurality of spaced offset rods or wires 13 connect the opposed pairs of plates 11, 11', the ends of the rods being welded to the flanges 12. The amount of offset of these rods is somewhat exaggerated in the drawing. The V plates 11, 11' are so arranged between the bars 6 that the ends 14 of the bars 6 are substantially in registration with the flanges 12 of the corresponding V plate.

As shown in Figure 2, the filter web 3 is arranged in the form of a V of triangular outline within the flanges 12 of the end plates, and extends around each of the separating bars 6 into the next adjacent pocket, so that the entire web extends in zigzag form through the series of pockets in a column. A clamp or insert is provided for holding the web in place in each pocket, which now will be described.

Referring to Figure 6, the clamp or pocket insert comprises two end bars 15, 15' constructed of angle iron, each being bent double at the middle to provide a hinge portion 16. The flange of each bar is cut away, as indicated at 17, to allow the bar to be bent. The bars are joined at the hinge portion by a curved stay 18, which may be welded in place, and the ends of the bars 15, 15' are joined by base bars 19, 19', which may be welded in place. In effect, the clamp comprises a pair of sashlike frame portions hinged together by the hinges 16. A plurality of offset wires or rods 20 connect the bars 15, 15', and may be secured to the flanges thereof by welding, the wires preferably being on the inner faces of the flanges. At each end a hairpin spring 21 has its arms 22 received in the flanges of the bars, and clips 24 (Figs. 7 and 2) welded to the base bars 19 and 19', hold the bent over ends of the springs in place. The springs bias the clamp frames to open position. Finger pieces or handles 25 welded to the base bars enable the clamp to be compressed against the spring action.

Referring to Figures 2, 3 and 4, it will be seen that the web 3 is threaded around the inside faces of the flanges 12 of the triangular end plates 11, 11', and the edges of the web are clamped in this position against the flanges 12 of the end plates by the spread end bars 15, 15' of the clamp. The stay bar 18 prevents excessive sagging of the filter web at the apex of the V. The wires 13 and 20 lie close enough to the filter web to support it so that the web cannot sag enough, when air is passing through the filter web, to pull out the edges from between the flanges 12 and bars 15, 15'. Thus, the running edges of the web are clamped against flanges 12, and the base bars 19, 19' hold the web against shoulders 8, 8'. The space between plates 11, 11' is open so that air can flow through the web.

To load the filter, the clamps are removed from all the pockets in a column, and the used filter web is removed. Now, starting at the bottom of the column, the filter web is held over the lower bar 6, and holding a clamp compressed by the finger pieces 25, the end 18 is pushed into the lowest pocket 7, thus stuffing the filter web into this pocket. When the clamp has been inserted to its limit of movement, the finger pieces are released, and the spreading of the bars 15, 15' moves the end bars 19, 19' against the shoulders 8, 8' to lock the clamp in position. This operation then is repeated for the next higher pocket, and so on, till the column is loaded. The web then can be severed from the roll.

In the modification shown in Figures 5 and 8, wherein like parts are designated by like reference numerals, the wires 13 on the triangular end plates 11, 11' are replaced by a coarse mesh wire screen 27. The flanges 12 have struck up tongues 28 which engage over a wire of the screen, and are bent down to hold the screen firmly in place. This modification is preferred where the direction of air flow is from the inside of the V towards the outside, as the screen provides extensive support against sagging of the filter web.

I claim as my invention:

1. An air filter comprising: a hollow frame having an open front face; means on said frame forming a V-shaped pocket having a mouth opening located adjacent the front face of said frame, said means including a pair of transversely extending spaced bars framing said mouth, at least one of said bars having an inwardly directed edge portion extending into the plane of said mouth opening; a pair of sash-like frame portions hinged together at one end and separated at the opposite end to form the apex and mouth of a V-shaped pocket insert, which is bodily insertible into and removable from said pocket, each frame portion having rigid longitudinal and transverse margins; a filter mat folded to form a V extending around and concealing the outer faces of said pocket insert and overlaying the longitudinal and transverse margins thereof; and spring means on said insert for biasing said hinged frame portions angularly apart, said spring means being operative, when the pocket insert with its folded mat is inserted into said pocket, to urge the lonlongitudinal and transverse margins of the insert outwardly so as to compressively clamp the overlaying corresponding marginal portions of the mat into sealing engagement with said pocket-forming means on the frame and to maintain the transverse margin of said frame portion in compressive engagement behind the inwardly directed edge portion of said spaced bars.

2. In a filter apparatus, a frame assembly defining a generally V-shaped filter medium supporting pocket, said frame assembly including a pair of opposed triangularly shaped end plates having the edge portions thereof turned inwardly to form a filter medium engaging peripheral flange, a pair of bar members connected intermediate the extremities of the base portion of said triangularly shaped end plates, at least one of said bar members having an inwardly turned edge cooperatively defining with the other bar member and the base portions of said triangularly shaped end plates a rectangularly shaped mouth opening for said pocket; a V-shaped pocket insert bodily insertable into and removable from said pocket, said pocket insert including a pair of frame members hingedly connected at one end to form a contoured apex sized to be disposed in abutting relation with the apex portion of the inwardly turned edge portions of said triangularly shaped end plates of said frame assembly, each of said frame members having rigid longitudinal marginal portions sized to be disposed in abutting relationship with the inwardly turned edge portions of said triangularly shaped end plates and rigid transverse portions remote from said hinged connection sized to be disposed in abutting relation with the bar members of said frame assembly and within said inwardly turned edge thereof for retention of said pocket insert in said pocket and spring means connected intermediate said frame members biasing the same angularly apart for maintaining the marginal portions of said frame members in compressive relationship with the aforesaid abutting elements of said frame assembly to peripherally support a filter medium disposed therebetween and to prevent removal of said pocket insert from said pocket.

3. Apparatus as specified in claim 2 including a grille structure connected between the inwardly turned edge portions of said triangularly shaped end plates to provide a support for the central portions of the filter medium disposed in said pocket.

References Cited in the file of this patent

UNITED STATES PATENTS

| 2,016,033 | Christofferson | Oct. 1, 1935 |

FOREIGN PATENTS

| 9,845 | Great Britain | Apr. 22, 1911 |
| 640,873 | Great Britain | Aug. 2, 1950 |